Patented Feb. 18, 1941

2,232,438

UNITED STATES PATENT OFFICE 2,232,438

UNSATURATED PREGNANOLONES AND PREGNANDIONES AND A METHOD OF PRODUCING THE SAME

Adolf Butenandt, Berlin-Dahlem, Germany, assignor to Schering Corporation, Bloomfield, N. J., a corporation of New Jersey No Drawing. Application April 10, 1939, Serial No. 267,182. In Germany August 4, 1934

23 Claims. (Cl. 260—397)

This invention relates to the manufacture of unsaturated hydroxy ketones and diketones and more particularly to compounds which have been named pregnenolones and pregnendiones.

This application is a continuation-in-part of my copending application Serial No. 34,599, filed August 3, 1935.

The process of manufacture in accordance with this invention consists of converting the corresponding 3-hydroxy-bisnorcholenic acids or their derivatives in the form of their esters into secondary-tertiary alcohols, splitting out water between the tertiary hydroxyl group and the adjacent tertiary hydrogen atom and splitting up the double bond thus produced in the side chain of the molecule, with suitable oxidizing agents with the formation of the corresponding hydroxy ketones or their derivatives.

Thus, by treatment of the 3-hydroxy-bisnor-cholenic acids, in which if desired the nuclear double bond is protected by saturation with halogen and in which it is advantageous to protect the alcoholic hydroxy group by acylation or in any other manner, i. e. by conversion into a group that upon hydrolysis is re-transformed into the hydroxy group, in the form of their esters with organo-metallic compounds, such as Grignard reagents, the corresponding unsaturated secondary-tertiary dialcohols are obtained. By splitting water out of these compounds from the tertiary hydroxyl group and the adjacent hydrogen atom, alcohols are produced which are unsaturated in the side chain. If it has not previously been effected, it is advisable to saturate now the nuclear double bond by means that are not affected by oxidation agents preferably by treatment with halogen; thereby advantageously also the hydroxy group is protected as described above. Oxidation, especially ozonization of the preferably dihalogenated and acylated compounds produced, if necessary, with subsequent splitting off of halogen and hydrolysis leads to the production of the desired unsaturated hydroxy ketones. These are distinguished from the corresponding saturated hydroxy ketone, pregnanolones merely by the presence of a nuclear double bond.

These unsaturated hydroxy ketones, the pregnenolones, according to a further object of this invention, are transformed by oxidation into unsaturated diketones, the so-called pregnendiones.

Thus, the unsaturated hydroxy ketone pregnenolone of the general formula $C_{21}H_{32}O_2$ passes on treatment with oxidising agents, which are capable of transforming a secondary hydroxy group into a keto group, into unsaturated diketones of the general formula $C_{21}H_{30}O_2$ which on testing for corpus luteum hormone action possess a high physiological activity. The oxidation can be carried out in such a manner that the unsaturated hydroxy ketone is treated with oxidising agents with or without intermediate protection of the double bond; preferably the double bond is protected against the action of the oxidising agent by adding on halogen, especially bromine, whereupon after oxidation the halogen is split off thereby restoring the double bond.

The reaction mechanism may be illustrated by the following formulas:

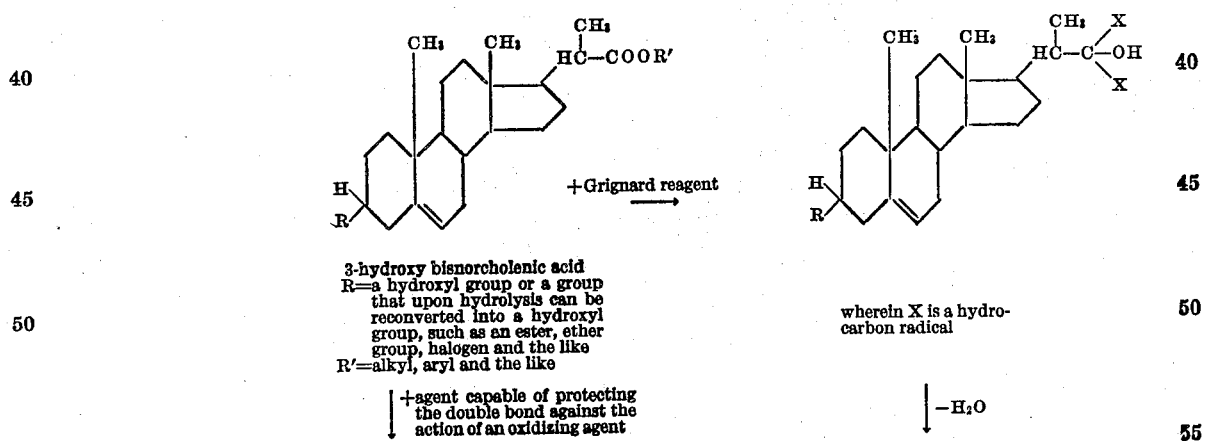

3-hydroxy bisnorcholenic acid
R=a hydroxyl group or a group that upon hydrolysis can be reconverted into a hydroxyl group, such as an ester, ether group, halogen and the like
R'=alkyl, aryl and the like +agent capable of protecting the double bond against the action of an oxidizing agent wherein X is a hydrocarbon radical $-H_2O$

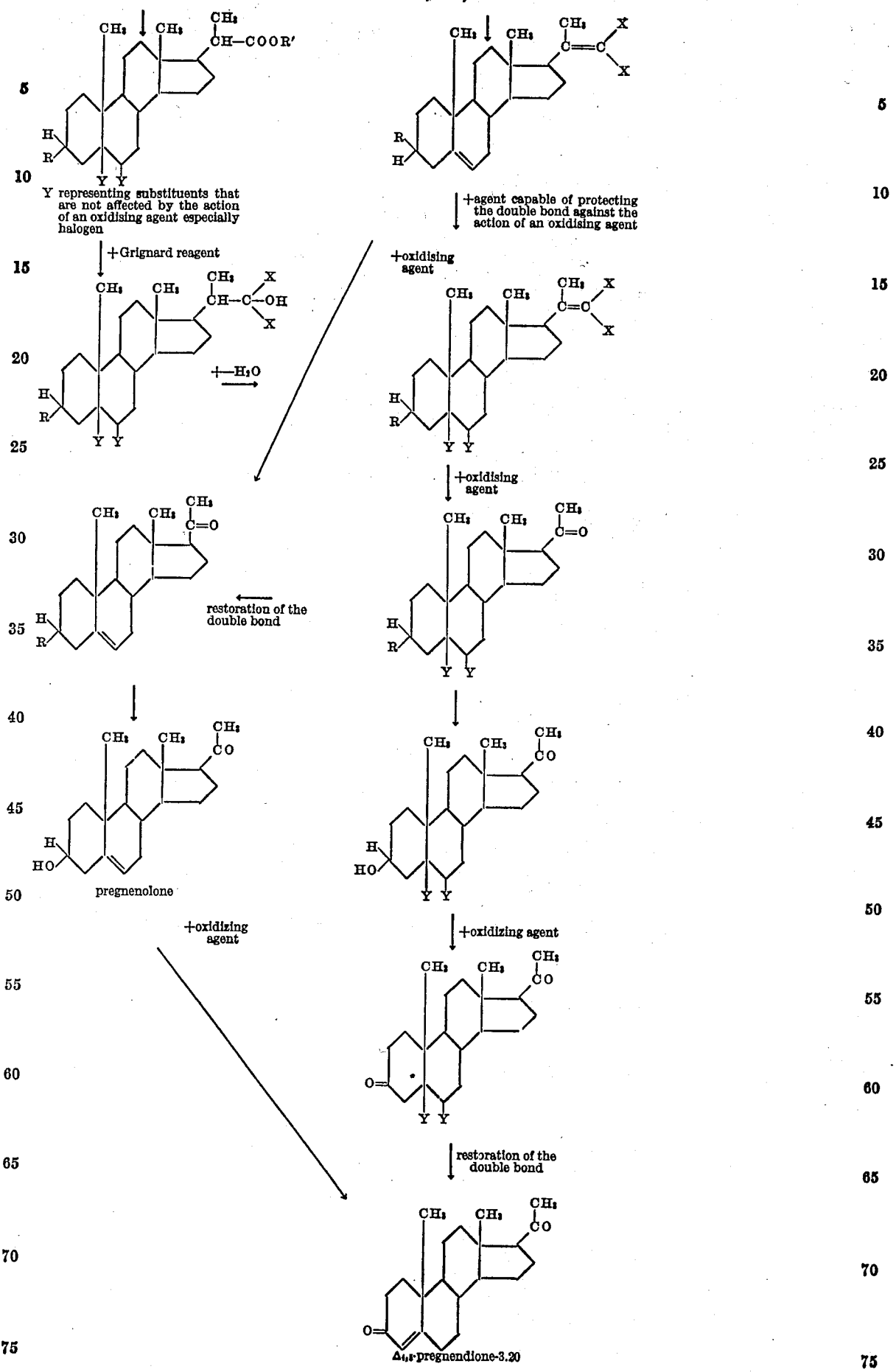

The following examples serve to illustrate the invention, without, however, limiting the same to them:

Example 1

From stigmasterol according to Fernholz (Annalen 507, 128, 1933) the acetoxybisnorcholenic acid is produced and is saponified by boiling with 5% methyl alcoholic caustic potash lye to the free 3-hydroxy bisnorcholenic acid (melting point 295° C.). From this by reaction with diazomethane in methyl alcoholic ethereal solution the methyl ester of the melting point 140° C. is obtained. 2.4 grams of hydroxy bisnorcholenic acid methyl ester in 150 ccs. of absolute ether are added with stirring to a solution of 3.9 grams Mg and 25.2 grams of bromobenzene in 150 ccs. of absolute ether. The reaction mixture is heated for three hours under a reflux condenser, the ether distilled off and the residue heated for eight hours on the water bath, then decomposition is effected with ice and the whole acidified with dilute sulphuric acid and exhaustively extracted with ether. After distilling off the ether the reaction product is distilled with steam, and finally the unreacted ester contained therein saponified by boiling with methyl alcoholic potash. The saponification solution is acidified, again distilled with steam and the residue taken up in ether and freed from the acid constituents by extraction by shaking with dilute caustic soda lye. The ethereal solution is then evaporated and treated with twice its volume of glacial acetic acid, boiled for several hours under a reflux condenser, the glacial acetic acid distilled off and the residue distilled in a high vacuum. The major portion passes over at 270-280° C. under 0.001 mm. pressure, as a yellowish oil which soon solidifies. Yield 1.2 grams. By heating with 5 grams of acetic anhydride an acetate is obtained therefrom of M. P. 216-217° C.

0.4 gram of the acetate are dissolved in 20 ccs. of chloroform and treated, with ice cooling, drop by drop with 0.125 gram of bromine (=2 atoms per molecule) in 5 ccs. of chloroform. Into this solution which now contains the dibromide of the acetate a stream of ozonized oxygen yielding about 6 mg. of ozone per minute is introduced for 1 hour with ice cooling. After removal of the chloroform the residue is treated for debromination with 1 gram of zinc dust and 20 ccs. of glacial acetic acid and heated for 1 hour on the water bath. The glacial acetic acid solution is thereupon filtered, diluted with water and extracted with ether. The ether extract is washed with caustic soda lye, decolorized with animal charcoal and evaporated. In this manner the acetate of the hydroxy ketone $C_{21}H_{32}O_2$ is obtained as an oily crystal mass which after recrystallisation from dilute alcohol exhibits the melting point 146-147° C.

By interaction with semicarbazide acetate the semicarbazone results of the melting point 263° C. and by splitting off the latter the free hydroxy ketone $C_{21}H_{32}O_2$ of the melting point 190° C. Yield about 0.15 gram. The same hydroxy ketone is obtained by direct saponification of the acetate.

Example 2

An ethereal solution of phenyl magnesium bromide is produced from 35 grams of dry magnesium turnings, 220 grams of bromobenzene, 440 ccs. of ether dried above sodium metal, and a trace of iodine by heating to boiling the reaction mixture for 1½ hours. To this solution there is allowed to drop a solution of 20 grams 3-acetoxy bisnorcholenic acid methyl ester in 450 ccs. of dry ether. Thereupon 600 ccs. of toluene dried above sodium metal, are added to the reaction mixture whereby at the same time the ether is distilled off. The toluene solution is then heated for 10 hours on a boiling water bath. All these reactions are carried out while stirring the reaction mixture thoroughly.

In order to work up the reaction product the toluene solution is poured into ice water and mixed with dilute sulphuric acid. After the addition of ether the aqueous layer is removed and the remaining ether-toluene solution is evaporated to dryness in a vacuum. The residue is saponified by boiling with 5% methanolic potassium hydroxide solution. The saponification mixture is acidified against Congo paper by addition of dilute sulphuric acid and subjected to steam distillation for a rather long period of time. The carbinol obtained thereby is boiled under reflux for 5 hours in 150 ccs. of glacial acetic acid. After distilling off the glacial acetic acid in a vacuum, the residue is acetylated by heating for about 10-15 minutes with acetic acid anhydride. The acetate is then precipitated from the reaction mixture by the addition of 100 ccs. of alcohol and, if necessary, is recrystallised from a chloroform ethanol mixture. 16-18 grams of a twofold unsaturated acetate having a melting point of 213-217° C. are obtained.

This acetate is dissolved in 300 ccs. of carbon tetrachloride and, in order to protect the double bond during oxidation is reacted with an amount of bromine corresponding to 2 atoms of bromine for 1 molecule of the acetate, dissolved in 120 ccs. of carbon tetrachloride, while cooling with ice. Thereupon the carbon tetrachloride is evaporated in a vacuum at about 40° C. and the residue is dissolved in 330 ccs. of chloroform. While cooling the chloroform solution with an ice-salt mixture, ozone is introduced into the solution during about 7 hours, thereafter the chloroform is evaporated in a vacuum at 40° C., the residue is dissolved in glacial acetic acid and the reaction product debrominated by adding zinc dust gradually in small portions to the solution. The reaction liquid is then diluted with water, poured off from the zinc dust which is repeatedly washed with water, and extracted with ether. The ethereal extracts are washed with sodium hydroxide solution and the residue remaining after evaporation of the ether is saponified with 5% methanolic potassium hydroxide solution.

After acidification, the saponification mixture is extracted with ether and the ether extract is washed, dried and concentrated by evaporation. Thereby part of the pregnenolone is directly obtained in crystalline form.

The amount remaining in the mother liquor is precipitated in the form of a semicarbazone by reaction with semicarbazide acetate.

The splitting of the pregnenolone semicarbazone having a melting point of 238-240° C. is carried out by heating the same for 2 hours with a solution containing 75 ccs. of ethanol, 15 ccs. of water and 10 ccs. of concentrated sulphuric acid. In order to isolate the pregnenolone the reaction mixture is mixed with water in the customary manner and extracted with ether. Thus, about 4-5 grams of pregnenolone of the melting point 190° C. are obtained.

Example 3

5 grams of 3-hydroxy bisnorcholenic acid methyl ester, as described in Example 1, by reaction with phenyl magnesium bromide followed by splitting off of water from the resulting secondary-tertiary dialcohol and treatment with acetic acid anhydride, are converted into the unsaturated acetate of the melting point 216–217° C.

1 gram of this unsaturated acetate is dissolved in 60 ccs. of dry ether. The solution is somewhat concentrated by heating on a water bath and mixed with 30 ccs. of pure glacial acetic acid, treated at 10° C. with dry hydrochloric acid gas and allowed to stand for 30 hours. Thereafter the ether is removed by evaporation and the precipitate is filtered off. 0.8 gram of a hydrochloride are obtained which can be purified by recrystallisation from acetic acid ethyl ester. The melting point of this hydrochloride is at 209–210° C. with development of gas.

0.5 gram of this hydrochloride are dissolved in 25 ccs. of carbon tetrachloride. While cooling with ice for 30 minutes a mixture of ozone in air containing 55 mg. of ozone in 1 liter, is passed through the solution. Thereafter 25 ccs. of glacial acetic acid are added and the mixture is allowed to stand for about 20 hours. Subsequently the carbon tetrachloride is evaporated in a vacuum at about 35–40° C. and the reaction product is precipitated from the remaining glacial acetic acid solution by addition of water. The precipitate is filtered off, dried, and in order to split off the hydrochloric acid is heated to boiling with 1 gram of potassium acetate in 15 ccs. of absolute ethanol for 9 hours. Thereupon the alcoholic solution is distilled with steam in order to remove the benzophenone formed during ozonisation.

The distillation residue is dissolved in ether. After evaporating the ether the product is repeatedly recrystallised from dilute methanol. The purified crystals correspond in their analytical composition to a pregnenolone acetate, and have a melting point of 144–145° C. On saponification with 1 N methanolic potassium hydroxide solution the corresponding pregnenol-3-one-20 is obtained.

Example 4

In a round flask provided with reflux cooler, stirrer and tube for introducing gas, a phenyl lithium solution is prepared from 500 ccs. of dry ether, 5 grams of lithium metal, and 47.4 grams of bromobenzene while passing nitrogen gas through the solution. The reaction is finished after about 5 hours. To the solution 20.1 grams of 3-acetoxy bisnorchloenic acid methyl ester dissolved in 1000 ccs. of ether are slowly added while stirring. Thereby the ether starts to boil and a white precipitate is formed. The reaction mixture is allowed to stand at room-temperature over night and 250 ccs. of water are added drop by drop while stirring thoroughly. The precipitate completely disappears. The ethereal layer is removed, washed with 250 ccs. of water dried with magnesium sulphate and thereafter evaporated to dryness. The residue is boiled with 40 ccs. of acetic acid anhydride for 2 hours; on cooling, the twofold unsaturated acetate precipitates in the form of small needles, which are filtered off and washed with some acetic acid anhydride. The product is then dissolved in glacial acetic acid, heated for 1 hour to boiling and then precipitated by adding water drop by drop. After cooling it is filtered off by suction and dried. 18.6 grams of the unsaturated acetate of the melting point 211–214° C. are obtained. From the acetic acid anhydride mother liquor there can be recovered by the addition of ether and subsequent washing with water and sodium carbonate solution a further small amount of acetate of lower degree of purity. The crude crystals are recrystallised from alcohol and yield altogether 16.9 grams of a pure twofold unsaturated acetate of the melting point 216–217° C.

The further working up of said twofold unsaturated acetate to pregnenolone is carried out in the manner described in the preceding examples.

Example 5

4.4 grams of the twofold unsaturated acetate obtained according to Example 4 having a melting point of 216–217° C. are brominated with 1.35 grams of bromine in 100 ccs. of chloroform whereupon the chloroform is removed by distillation in a vacuum at about 20° C. The white residue is dissolved with 50 ccs. of benzene and shaken with 110 ccs. of 5% potassium permanganate solution and 40 ccs. of 20% sulphuric acid for 24 hours at room-temperature. The potassium permanganate was then completely used up. By careful addition of sodium bisulphite solution the precipitated manganese dioxide is dissolved. The benzene solution is removed and the aqueous mother liquor repeatedly extracted with ether. The combined benzene ether solutions are washed with sodium bicarbonate and water, dried with anhydrous sodium sulphate and evaporated to dryness in a vacuum. The residue is debrominated with 2 grams of zinc dust in 50 ccs. of glacial acetic acid. The debrominated product (3.4 grams) is boiled with 50 ccs. of methanol. Thereby 1.5 grams of the starting material remain undissolved. The methanolic solution is mixed with methanolic solution of semicarbazide, acidified with acetic acid, and allowed to stand for 24 hours. The precipitated crystals (1.1 grams) are washed with a little ice cooled ether and the pure pregnenolone acetate semicarbazone obtained is split up with oxalic acid in ethanol whereby the pregnenol-3-one-20 is obtained.

Of course, the twofold unsaturated compound obtained according to the preceding examples by splitting off water can also be oxidised in the form of the free alcohol instead of the ester or the like. For this purpose the acetate of the twofold unsaturated compound of the melting point 217° C. is saponified, for instance, by means of 3% methanolic potassium hydroxide solution. The twofold unsaturated free alcohol which on recrystallisation from acetone has a melting point of 112° C. is dissolved in chloroform, reacted with the equivalent amount of bromine in order to protect the ring double bond and into this solution ozone is introduced during about 20 minutes while cooling. On working up the reaction mixture in the above described manner 160 mg. of the free twofold unsaturated alcohol yield about 40 mg. of pure pregnenolone of the melting point 190° C., besides other oxidation products.

Instead of using 3-acetoxy bisnorcholenic acid as starting material, also other derivatives of said acid may be used, especially those wherein the hydroxy group is protected by esterification or etherification or by substitution by halogen, that is, in a manner which permits subsequent restoration of the hydroxy group.

Instead of ozone and potassium permanganate, of course, there may be used likewise other oxidation agents capable of splitting off a double bond under formation of a keto group as they are known, for instance, from Houben-Weyl, Methoden der organischen Chemie, 3rd edition, volume 2nd, pages 153–161 ff. Furthermore, instead of Grignard reagent and phenyl lithium solution other organo metal compounds may be employed as they are known, for instance, from Houben-Weyl, Methoden der organischen Chemie, 3rd edition, 3rd vol., pages 94–95.

The intermediate protection of the double bond by halogen or the like may also be carried out in the customary manner, for instance, in Houben-Weyl, Methoden der organischen Chemie, 3rd ed., 2nd vol., pages 968–974, while the reformation of the double bond may be made according to Houben-Weyl, Methoden d. organ. Chemie, 3rd ed., 3rd vol., page 1209 ff, and 3rd ed., 2nd vol., page 1005 ff.

The oxidation of the hydroxy ketones $C_{21}H_{32}O_2$ obtained according to the above mentioned examples or by other methods to the corresponding diketone $C_{21}H_{30}O_2$, pregnendione, is carried out in the following manner:

I. DIRECT OXIDATION OF THE UNSATURATED HYDROXY KETONE

Example 6

A solution of hydroxyketone in pure glacial acetic acid is treated with a quantity of chromium trioxide corresponding to three atoms of available oxygen in glacial acetic acid. Care is taken that the temperature does not exceed 15° C. The mixture is allowed to stand for 1 to 2 days in an ice chest and then diluted with water and taken up with ether. From the ethereal solution the acid constituents are extracted by shaking with sodium carbonate; the remaining neutral constituents crystallise in white needles and exhibit a melting point of 120 to 135° C.

Instead of chromium trioxide Beckmann chromic acid mixture can be employed.

Example 7

The oxidation can also be carried out in such a manner that the hydroxy ketone is fused in a wide-mouthed reagent glass at a bath temperature of 280–300° C. and 5 times the weight of finely powdered copper oxide introduced in 3–4 portions. After 1 hour the reaction product is repeatedly shaken with anhydrous methyl alcohol, the solution treated in the cold with animal charcoal and the solvent allowed to evaporate. The diketone mixture above described remains.

Example 8

1 g. of pregnenol-3-one-20 is dissolved in 100 ccs. of dioxane and 5 gs. of concentrated potassium hydroxide solution. To this solution there is added a mixture of 100 ccs. of dioxane and 1.1 gs. of 30% hydrogen peroxide; the temperature is gradually increased to water bath heat whereby the excess of hydrogen peroxide is boiled off. Thereupon the reaction solution is diluted with water and extracted with ether. The pregnendione is obtained from the ethereal solution in the same manner as described in the preceding examples. It is possible to use ferrous sulphate as catalyst.

II. OXIDATION OF THE HYDROXY KETONE WITH PROTECTION OF THE DOUBLE BOND

The double bond can be most simply protected by allowing one molecular proportion of bromine to react on the hydroxy ketone in glacial acetic acid or chloroform solution. The dibromide produced can be converted into the diketone either by means of the above described oxidation reactions or there can be employed as oxidising agent $KMnO_4$ in dilute aqueous, acid solution. As reaction product is produced in this case a brominated diketone which is debrominated by short heating with zinc dust in glacial acetic acid solution.

Of course, the double bond may be protected in any other known manner as it is described, for instance, in Houben-Weyl, Methoden der organischen Chemie, Edition III, vol. 2, p. 968–974. The reformation of the double bond after oxidation may also be carried out in any other known manner as it is described, for instance, in Houben-Weyl Methoden der organischen Chemie, Edition III, vol. 3, page 140 ff. and ed. III, vol. 2, p. 1005. As most suitable oxidation agent there has proved chromium trioxide although other means may also be employed.

Example 9

For the production of the brominated hydroxy ketone 70 mgs. of pregnenolone are dissolved in 10 ccs. of glacial acetic acid and treated drop by drop with a solution of 25.3 mgs. of bromine in 3 ccs. of glacial acetic acid. Rapid decolourisation of the bromine takes place. The dibromide can be isolated by means of chloroform and is obtained after recrystallisation from dilute alcohol in colourless needles of M. P. 104° C.

The brominated hydroxy ketone is dissolved in benzene and the benzene solution shaken with aqueous acid potassium permanganate solution sufficient to provide three molecules of oxygen. After distilling off the benzene quantitative yields of brominated diketone are obtained which is heated for ten minutes in glacial acetic acid solution in the presence of zinc dust. The reaction product is precipitated with water.

Example 10

To the bromination solution obtained according to Example 9 there is added without isolation of the dibrominated hydroxy ketone in the cold drop by drop a quantity of chromium trioxide corresponding to 5 atoms of available oxygen in 13 ccs. of glacial acetic acid. After standing for 20 hours at 20° C. the reaction solution is poured into water and extracted with ether. After evaporation of the ethereal solution there remains a colourless oil which is heated for 10 minutes on the water bath with 2 ccs. of glacial acetic acid and about 1 g. of zinc. dust. The reaction product is precipitated with water, taken up in ether and sublimed in a high vacuum (130° C., $10^{-3}$ mm.). The crude crystals exhibit all the properties of the corpus luteum-hormone obtained from natural sources or from pregnandiol, and on mixing therewith gives no depression of the melting point.

Example 11

200 mgs. of pregnenolone of melting point 190° C. are dissolved in 15 ccs. of glacial acetic acid. To this solution there is added drop by drop while cooling in ice a solution of 101.2 mgs. of bromine (corresponding to 2 atoms=0.032 ccs. of bromine) in 5 ccs. of glacial acetic acid. The bromination solution is then mixed with a solution of 126 mgs. of chromium trioxide in 17.6 ccs. of glacial acetic acid and a trace of water while cooling and stirring. The reaction mixture is then allowed to stand for about 48 hours at 20° C. whereupon the excess of oxidation agent is destroyed by means of methanol. It is then poured in water and extracted with ether. The ethereal solution is washed and dried with anhydrous sodium sulphate and evaporated to dryness with the addition of some zinc dust. The residue is mixed with about 5 gs. of zinc dust and is heated after addition of 10 ccs. of glacial acetic acid for 10 minutes on the boiling water bath. The debromination solution is diluted with water and extracted with ether. The ethereal solution is washed with 5% sodium carbonate, water, dilute sulphuric acid (1:5) and again with water, dried over sodium sulphate and evaporated to dryness. The residue is recrystallised from dilute alcohol. Thereby 73 mgs. of $\Delta_{4,5}$-pregnendione having a melting point of 128.5° C. are obtained.

Of course, instead of brominating pregnenolone it is also possible to use an already brominated pregnenolone as starting material as it can be obtained in the course of the conversion of 3-hydroxy-bisnorcholenic acid into pregnenolone as described in the Examples 1, 2 and 5.

The $\Delta_{4,5}$-pregnendione-3,20 obtained according to the above described examples exhibits the same physiological activity as the so-called corpus luteum hormone present in the corpora lutea of the ovaries. It is, however, distinguished from the hormone present in the corpora lutea by its extraordinary stability.

Attention is called to the fact that a shift in the position of the double bond takes place when oxidizing $\Delta_{5,6}$-pregnenolone to $\Delta_{4,5}$-pregnendione. This is surprising but is caused by the fact that with ketones, i. e. with compounds wherein the oxygen atom is connected to a carbon atom by the double bond the formation of a system of conjugated double bonds very readily takes place. Thus in the present case the double bond between the carbon atom 5 and 6 changes its position so as to be located between the carbon atom 4 and 5 thereby producing a system of conjugated double bonds of the following formula:

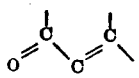

Of course, various modifications and changes in the reaction conditions etc. may be made by those skilled in the art in accordance with the principles set forth herein and in the claims annexed hereto.

What I claim is:

1. An unsaturated hydroxy ketone of the general formula $C_{21}H_{32}O_2$ and corresponding to the structural formula

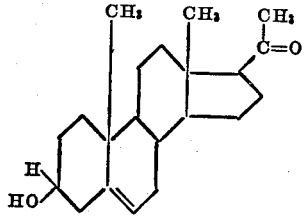

having a melting point of about 190° C., its acetate having a melting point of about 147° C.

2. An unsaturated hydroxy ketone compound of the general formula $C_{21}H_{31}XY$ and corresponding to the structural formula

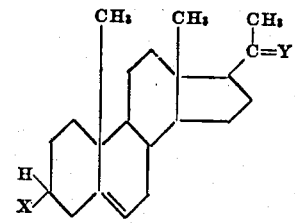

wherein X represents a member of the group consisting of an alcoholic hydroxy group and a substituent which on hydrolysis is transformed into an alcoholic hydroxy group and Y is a member of the group consisting of =O and a group which is formed by condensing the ketone with a condensing agent for ketone groups.

3. A method for the production of pregnenolones and pregnendiones, comprising reacting a bisnorcholenic acid of the formula $$C_{21}H_{31}(R)(COOR')$$

wherein R is in the 3-position and is a member of the group consisting of alcoholic hydroxyl and a substituent which by hydrolysis can be reconverted into an alcoholic hydroxyl group, while COOR' is at the C-20-position and R' represents a hydrocarbon radical, with an organo-metallic compound of the Grignard type, dehydrating the so obtained secondary-tertiary dialcohol by splitting out water between the tertiary hydroxyl group and the adjacent tertiary hydrogen atom, and oxidizing the resulting unsaturated alcohol to the extent of splitting up the double bond in the side chain so as to form the corresponding pregnenolone compound of the structural formula

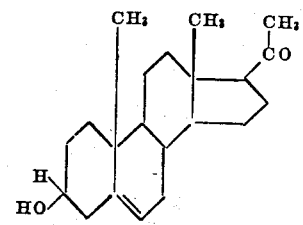

4. A method according to claim 3, wherein during oxidation of the double bond in the side chain the double bond in ring 2 is protected against the action of the oxidizing agent by intermediate saturation with halogen.

5. A method according to claim 3, wherein the double bond in ring 2 is protected during the course of the reaction by intermediate saturation with halogen.

6. A method according to claim 3, wherein the pregnenolones obtained are oxidized by conversion of the alcohol into a ketone group so as to transform said pregnenolones into the corresponding pregnendione $C_{21}H_{30}O_2$ corresponding to the structural formula

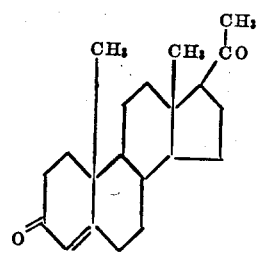

7. A method according to claim 3, wherein the unsaturated hydroxy ketone $C_{21}H_{32}O_2$ obtained is first saturated at the double bond in ring 2 by the addition of removable substitutents thereat and such double bond thus protected during the subsequent oxidation, subsequently oxidizing the compound obtained and thereupon reestablishing the double bond so as to form an unsaturated diketone pregnendione of the general formula $C_{21}H_{30}O_2$ corresponding to the structural formula

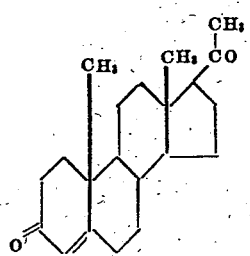

8. A method of producing a pregnendione $C_{21}H_{30}O_2$ comprising oxidizing an unsaturated hydroxy ketone $C_{21}H_{32}O_2$ only at the hydroxyl group, whereby the unsaturated diketone $C_{21}H_{30}O_2$ is formed.

9. A method according to claim 8 wherein the unsaturated compound is first saturated at the double bond in ring 2 by the addition of removable substituents thereat and such double bond thus protected during the subsequent oxidation.

10. A process for producing $\Delta_{4,5}$-pregnendione-3,20 comprising treating $\Delta_{5,6}$-pregnenol-3-one-20 with a sufficient amount of bromine to produce pregnenolone dibromide, oxidizing the dibromide with an agent capable of converting the OH group of the compound to a keto group, treating the oxidized product with zinc dust to remove the bromine from the molecule, and recovering the $\Delta_{4,5}$-pregnendione-3,20 thus formed.

11. A method of producing pregnendione of the general formula $C_{21}H_{30}O_2$ comprising oxidizing a pregnenolone having the general formula $C_{21}H_{32}O_2$, wherein the hydroxyl group is located in one of the 3 and 20 positions and the keto group in the other of such positions, with an oxidizing agent capable of converting a secondary alcohol group to a keto group, whereby the unsaturated diketone $C_{21}H_{30}O_2$ is formed.

12. A method of producing pregnendione of the general formula $C_{21}H_{30}O_2$ comprising oxidizing pregnenol-3-one-20 of the general formula $C_{21}H_{32}O_2$ with an oxidizing agent capable of converting a secondary alcohol group to a keto group, whereby the unsaturated diketone $C_{21}H_{30}O_2$ is formed.

13. A method according to claim 12, wherein the pregnenolone is first saturated at the double bond by the addition of halogen and such double bond thus protected during the subsequent oxidation.

14. $\Delta_{4,5}$-pregnendione-3,20 corresponding to the general formula $C_{21}H_{30}O_2$ and the structural formula

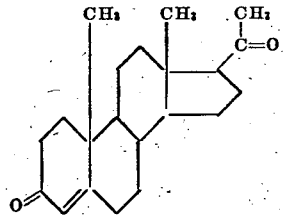

said pregnendione existing in two modifications having the melting point 120° C. and 128.5° C. respectively, its dioxime melting at 243° C. and possessing the physiological activity of the corpus luteum hormone.

15. A method of producing pregnendione of the general formula $C_{21}H_{30}O_2$ comprising oxidizing pregnenol-3 compounds with an oxidizing agent capable of converting a secondary alcohol group to a keto group, whereby the unsaturated diketone $C_{21}H_{30}O_2$ is formed.

16. The method of producing pregnendione comprising oxidizing a pregnenol compound derived from 3-hydroxy-bisnorcholenic acid with an oxidizing agent capable of converting a secondary alcohol group to a keto group, whereby the unsaturated diketone $C_{21}H_{30}O_2$ is formed.

17. A material having the physiological activity of the corpus luteum hormone, comprising the oxidation product of a pregnenolone.

18. A material having the physiological activity of the corpus luteum hormone, comprising the oxidation product of a pregnenol-3-one-20.

19. A stable, isolated crystalline $\Delta_{4,5}$-pregnendione-3,20 corresponding to the general formula $C_{21}H_{30}O_2$ and possessing the physiological activity of the corpus luteum hormone.

20. The mixture obtained by subjecting a solution of a pregnenolone to an agent capable of converting the secondary hydroxyl group to a keto group.

21. An oxidative degradation product of a sterol, said product having the physiological action of a the corpus luteum hormone and containing as an essential component $\Delta_{4,5}$-pregnendione-3,20 corresponding to the general formula $C_{21}H_{30}O_2$.

22. An unsaturated, ketonic oxidative degradation product of a sterol, said product having the general formula

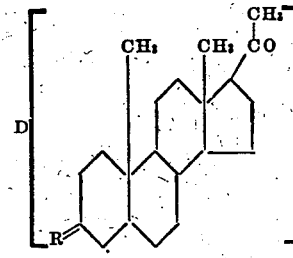

R being a member of the group consisting of

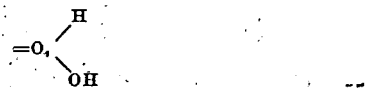

and groups convertible into the latter with the aid of hydrolysis, D representing a double bond which is in the 4,5-position when R is =O, and in the 5,6-position when R is

or a group convertible thereinto with the aid of hydrolysis.

23. A material having the physiological activity of the corpus luteum hormone, and comprising $\Delta_{4,5}$-pregnendione-3,20 corresponding to the general formula $C_{21}H_{30}O_2$, said material obtained by degradation of the side chain of a sterol compound to a —CO—CH$_3$ group and oxidation of the 3-hydroxyl group to a keto group.

ADOLF BUTENANDT.

CERTIFICATE OF CORRECTION.

Patent No. 2,252,438.  February 18, 1941.

ADOLF BUTENANDT.

It is hereby certified that error appears in the printed specification of the above numbered patent requiring correction as follows: Page 7, second column, line 32, claim 21, strike out the article "a"; and that the said Letters Patent should be read with this correction therein that the same may conform to the record of the case in the Patent Office.

Signed and sealed this 1st day of April, A. D. 1941.

(Seal)

Henry Van Arsdale,
Acting Commissioner of Patents.